(12) United States Patent
Lloyd

(10) Patent No.: US 6,185,877 B1
(45) Date of Patent: Feb. 13, 2001

(54) COMBINATION GREENHOUSE AND COLD FRAME APPARATUS

(76) Inventor: Daniel Lloyd, P.O. Box 907, Concord, NH (US) 03302

( * ) Notice: Under 35 U.S.C. 154(b), the term of this patent shall be extended for 0 days.

(21) Appl. No.: 09/270,250

(22) Filed: Mar. 15, 1999

(51) Int. Cl.[7] ............................................. A01G 13/06
(52) U.S. Cl. ............................ 52/64; 52/83; 52/222; 52/5; 52/63; 47/28.1
(58) Field of Search .................... 52/83, 222, 3, 52/5, 63, 64, 74, 78; 135/88.13, 124; 47/26, 28.1, 31

(56) References Cited

U.S. PATENT DOCUMENTS

| | | |
|---|---|---|
| 2,827,138 * | 3/1958 | Roy, Sr. ................................... 52/63 |
| 2,986,150 * | 5/1961 | Torian ...................................... 135/1 |
| 3,812,616 | 5/1974 | Koziol . |
| 4,091,584 | 5/1978 | Brown . |
| 4,571,897 * | 2/1986 | Kerr .................................... 52/222 X |
| 4,577,436 | 3/1986 | Dalle . |
| 4,601,136 | 7/1986 | Watanabe . |
| 4,671,011 | 6/1987 | Jantzen . |
| 4,809,592 | 3/1989 | Caldwell . |
| 4,837,990 | 6/1989 | Peleg . |
| 4,915,022 | 4/1990 | Lynch . |
| 5,038,517 | 8/1991 | Talbott . |
| 5,179,798 | 1/1993 | Sanagere . |
| 5,197,238 * | 3/1993 | Peleg ........................................ 52/13 |
| 5,216,834 | 6/1993 | Crowley . |
| 5,333,421 * | 8/1994 | McKenna ............................. 52/63 X |
| 5,333,425 * | 8/1994 | Nickerson et al. ..................... 52/222 |
| 5,479,744 | 1/1996 | Meyer . |
| 5,564,234 * | 10/1996 | Vermeulen .......................... 52/222 X |
| 5,605,007 | 2/1997 | Hinsperger . |
| 5,784,842 * | 8/1998 | Wackerbauer .......................... 52/222 |
| 5,813,169 | 9/1998 | Engerman . |

* cited by examiner

*Primary Examiner*—Carl D. Friedman
*Assistant Examiner*—Phi Dieu Tran A
(74) *Attorney, Agent, or Firm*—William B. Ritchie (57) ABSTRACT

The combination greenhouse cold frame apparatus includes two foldable side panels that cover two arched sides that have a plurality of arched vertical legs to provide a framework for the foldable side panels. The arched sides are connected with the help of a junction between them that has a plurality of top frame connectors each having two ends that are dimensioned to receive the arched vertical legs. The top frame connectors also have a U-shaper portion dimensioned to hold the foldable side panels in different stages of retraction. A plurality of securing devices connectable to an exterior of the arched vertical legs is used to secure the foldable side panels when they are in a partially open position. Each foldable side panel can independently or jointly be opened from a top in a downward direction or from a bottom in an upward direction completely or partially, thereby providing adjustable amounts of sunlight and ventilation for plants enclosed by the combination green house and cold frame apparatus.

10 Claims, 9 Drawing Sheets

COMBINATION GREENHOUSE AND COLD FRAME APPARATUS

FIELD OF THE INVENTION

The present invention relates to greenhouses and, in particular, to a greenhouse and cold frame apparatus that is portable and modular in length with as many sections installed as needed.

BACKGROUND OF THE INVENTION

Greenhouses are typically used to provide a controlled environment for plant growth. The environment within a greenhouse is controlled by varying the amount of sunlight, heat and ventilation. Various structures of greenhouses exist in the art to provide plant growth in a controlled environment. These structures vary in complexity and consist of both fixed and portable embodiments.

A typical greenhouse consists of a framework enclosing a space; this framework being covered with a flexible material such that plants in the enclosed space can be provided with varying amounts of light and ventilation through various techniques of adjusting the flexible material.

One such technique is disclosed in U.S. Pat. No. 5,038,517 issued Aug. 13, 1991 to Talbott and describes a greenhouse with a flexible cover positionable over the frame for providing a roof enclosure for the structure. An elongate roller is secured to a lengthwise edge of the cover and a power source is coupled to the roller. When the roller is rotated about its longitudinal axis with the help of the power source, the cover retracts or extends relative to the frame thereby providing the plants with variable amounts of light and ventilation.

U.S. Pat. No. 5,216,834 issued Jun. 8, 1993 to Crowley provides another technique that utilizes a pair of opposed spools mounted on respective sides of a framework such that the cover is wound from one spool to the opposed spool.

U.S. Pat. No. 5,813,169 issued Sep. 29, 1998 to Engerman discloses a portable greenhouse construction with a roof that is arch shaped and includes a pair of retractable, translucent covers which are rolled up onto a shaft to permit fresh air into the interior of the greenhouse through a mesh screen.

Prior art methods of adjusting flexible covers for greenhouses pose several significant problems. First, present systems allow for retraction of flexible covers in only one direction, from down up, and extension also in one direction, from up down. Therefore effective control of sunlight falling on the plants can only be accomplished partially with prior art greenhouse embodiments. Adjusting openings in a greenhouse roof based on wind direction is also limited.

Another problem with current apparatus is the need for a rotatable shaft attachment for extension or retraction of the flexible covers. The use of this increases the complexity and also the time taken to assemble the system by adding a step to the process.

An offshoot of increased structural complexity of the greenhouse is increased cost and also more difficulty in installing additional sections to increase the length of the greenhouse.

Therefore, a means for bi-directional extension and retraction of covers for greenhouses which simultaneously eliminates the need for an attached rotatable shaft to accomplish cover adjustment is desired. Reduced structural complexity, decreased cost and ease of adding additional sections are also desired.

SUMMARY OF THE INVENTION

The present invention is a combination greenhouse cold frame apparatus. In its most basic form, the combination greenhouse cold frame apparatus includes two foldable side panels that cover two arched sides that have a plurality of arched vertical legs to provide a framework for the foldable side panels. The arched sides are connected together with the help of a junction between them that has a plurality of top frame connectors each having two ends that are dimensioned to receive opposing arched vertical legs. The top frame connectors also have a U-shaped portion dimensioned to hold the foldable side panels in different stages of retraction. A plurality of securing devices connectable to an exterior of the arched vertical legs is used to secure the foldable side panels when they are in a partially open position. Each foldable side panel can independently or jointly be opened from a top in a downward direction or from a bottom in an upward direction completely or partially, thereby providing adjustable amounts of sunlight and ventilation for plants enclosed by the combination green house and cold frame apparatus. The combination greenhouse and cold frame apparatus can be modified for additional stability by the incorporation of support members within the frame structure.

Therefore, it is an aspect of the invention to provide a combination greenhouse and cold frame apparatus with foldable side panels that can independently or jointly be opened from a top in a downward direction or from a bottom in an upward direction, either completely or partially in both directions.

It is a further aspect of the invention to provide a combination greenhouse and cold frame apparatus that may be easily installed and is simple and easy to construct.

It is a further aspect of the invention to provide a combination greenhouse and cold frame apparatus that is low cost and easily extendable by adding sections.

These aspects of the invention are not meant to be exclusive and other features, aspects, and advantages of the present invention will be readily apparent to those of ordinary skill in the art when read in conjunction with the following description, appended claims and accompanying drawings.

DETAILED DESCRIPTION OF THE DRAWINGS

Figure 1:
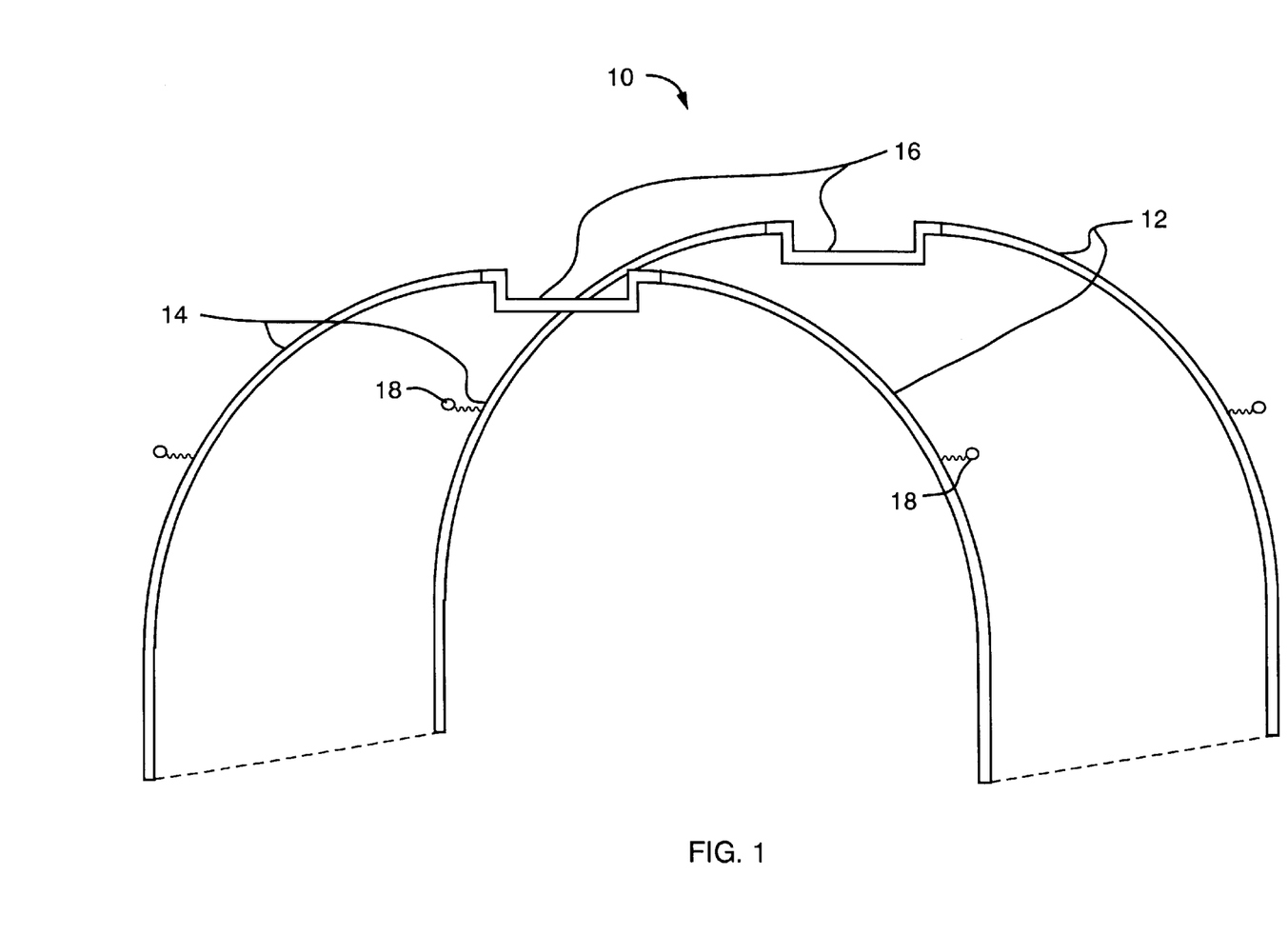
FIG. 1 is an isometric view of a frame of an embodiment of the present invention.
Figure 2:
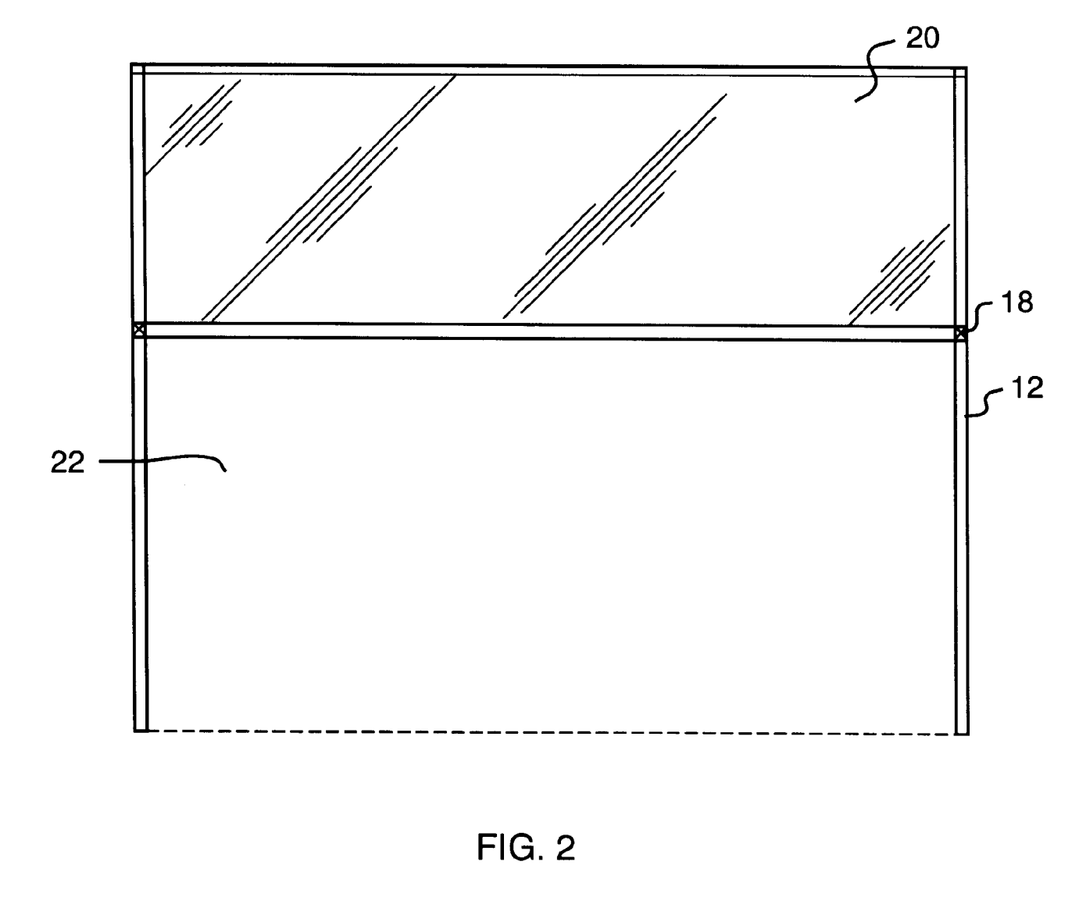
FIG. 2 is a profile view of the frame of FIG. 1 with the addition of two foldable side panels to form a complete combination greenhouse and cold frame apparatus.

Referring to FIG. 1 for details of a frame for the present invention and FIG. 2 for a combination of the frame of FIG.

1 and two foldable side panels, a complete embodiment of the present invention is shown. The frame 10 consists of arched vertical legs 12 and 14, and a junction composed of top frame connectors 16 have a U-shaped portion and left and right ends that connect opposing arched vertical legs 12 and 14. The U-shaped portion of top frame connectors 16 hold foldable side panels 20 and 22 that are used to control the amount of ventilation and sunlight that enters an area enclosed by the frame and also to protect plants and seedlings from wind and rain. Securing devices 18 connected to the middle portions of vertical arched legs 12 and 14 hold ends of foldable side panels 20 and 22 when partial extension or retraction of foldable side panels 20 and 22 is desired.

Figure 3:
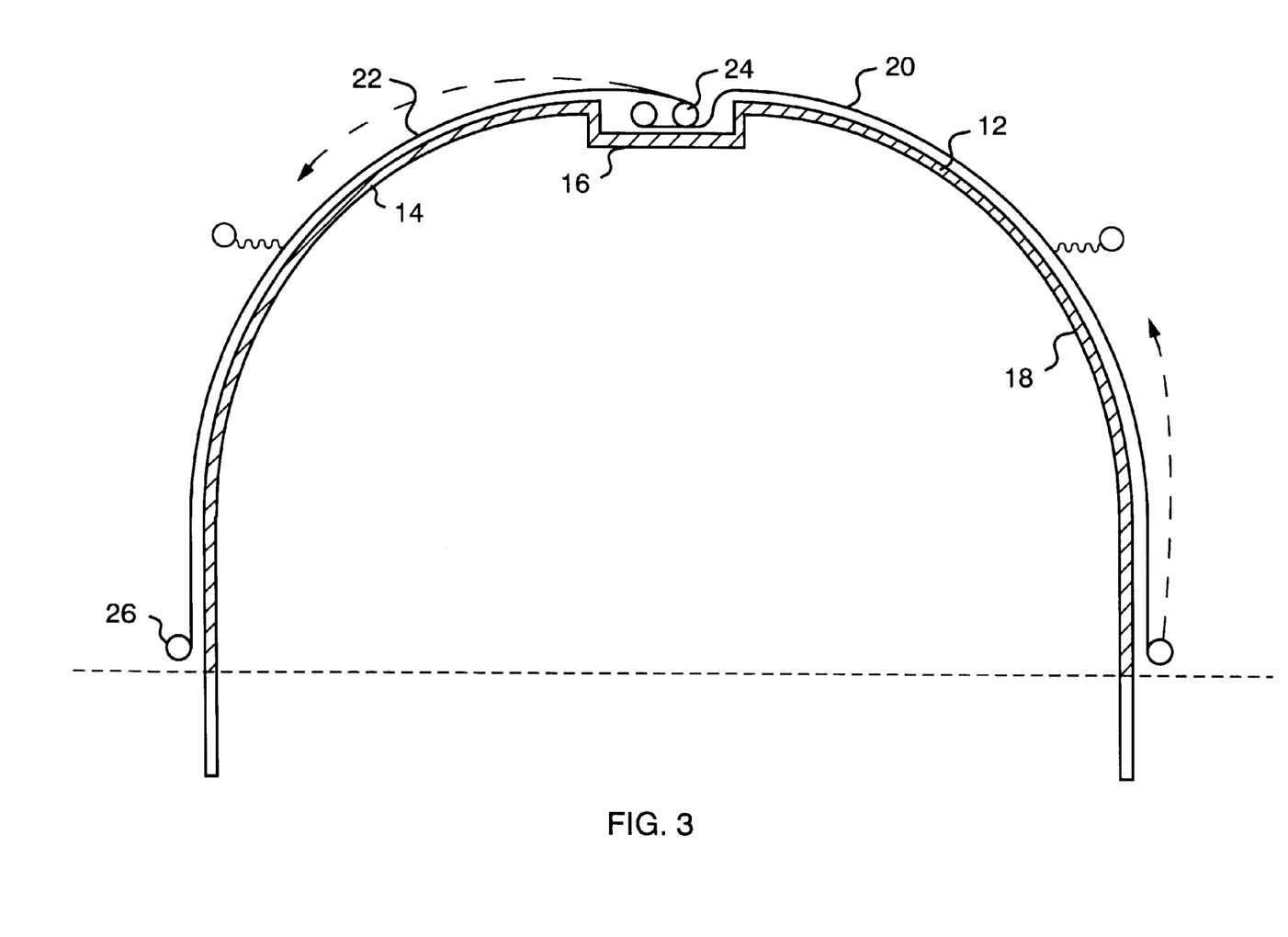
FIG. 3 is a sectional view of two foldable side panels and two opposing arched vertical legs of the present invention.

FIG. 3 is a sectional view of two foldable side panels and two arched vertical legs of the present invention. The foldable side panels 20 and 22 each have horizontal members 24 and 26 at a top and bottom end. A user can control the amount of sunlight and ventilation in an area enclosed by the frame 10 by suitably moving one or both foldable side panels 20 and 22 along arched vertical legs 12 and 14 of frame 10. In a completely closed position, foldable side panels 20 and 22 have horizontal members 24 placed in U-shaped portions of top frame connectors 16 and horizontal members 26 at a ground level. From this closed position, foldable side panels 20 and 22 can be independently or jointly opened from a top in a downward direction by moving a horizontal members 24 of foldable side panels 20 and/or 22 and placing them in securing devices 18 for partial opening. For complete opening of one or both foldable side panels 20 and 22 in a downward direction, horizontal members 24 would be moved to a ground level and placed beside horizontal members 26. From a closed position, similar movement from a bottom in an upward direction can be accomplished. Upward opening requires horizontal members 26 of foldable side panels 20 and/or 22 to be moved from a ground level in an upward direction and placed in securing devices 18 for partial opening or in U-shaped portions of top frame connectors 16 along with horizontal members 24 for complete opening. Horizontal members 24 and 26 of foldable side panels 20 and 22 are identical and therefore positions of these horizontal members 24 and 26 are interchangeable. Bi-directional adjustment of foldable side panels 20 and 22 allows for adjustable amounts of sunlight and ventilation to be provided for plants enclosed by the combination green house and cold frame apparatus.

Translucent light-stabilized plastic materials such as regular greenhouse plastic or reinforced greenhouse plastic are preferred choices for foldable side panels 20 and 22, although mesh or other materials having perforations that are adjustable may be used. Regular PVC pipe or lightweight PVC pipe are preferred materials for construction of frame 10, though other plastics or metals such as Aluminum may also be used. The preferred method of connecting different members of frame 10 is through screw connectors. Other methods such as push-in or snap connection methods can also be used to assemble frame 10. The combination greenhouse and cold frame apparatus is therefore simple to construct, portable and easy to operate.

Figure 4:
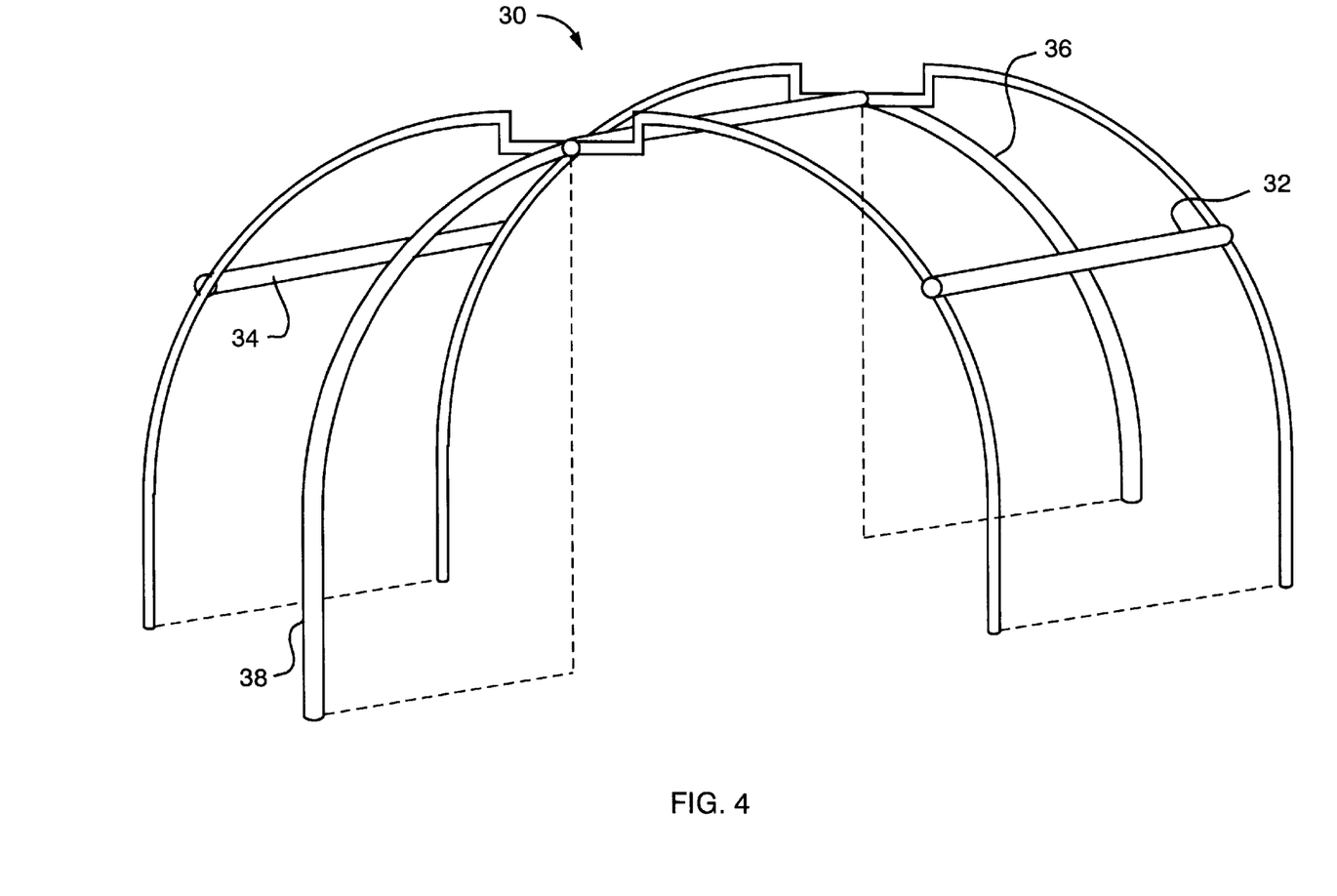
FIG. 4 is an isometric view of an embodiment of the present invention with additional support members.

FIG. 4 is an isometric view of an embodiment of the present invention with additional support members. In this embodiment additional support is provided for frame 30 by the inclusion of horizontal members 32 and 34 and end vertical arches 36 and 38. Horizontal members 32 and 34 also prevent sagging of foldable side panels.

Figure 5:
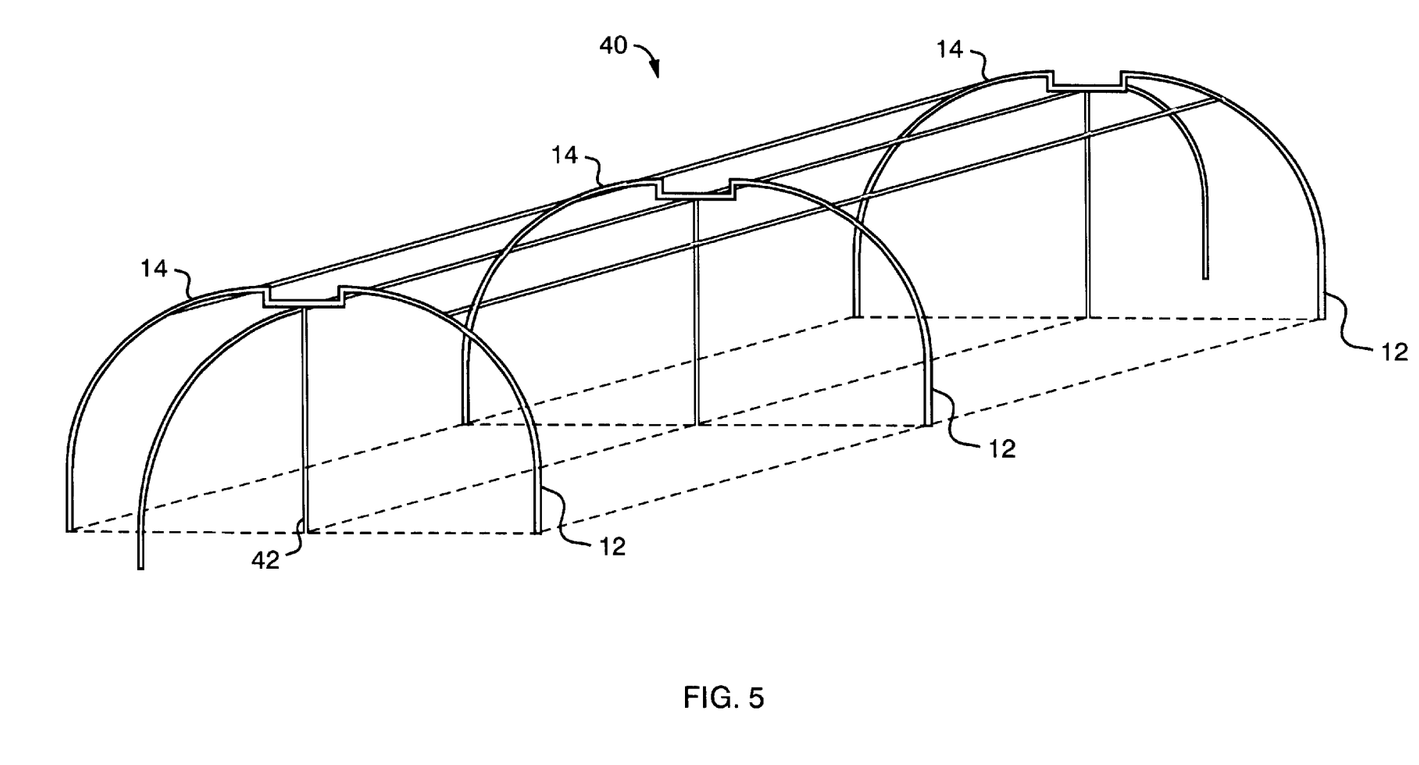
FIG. 5 is an isometric view of the present invention with three opposing pairs of arched vertical legs and additional vertical support members.

FIG. 5 is an isometric view of the present invention with three pairs of arched vertical legs and additional vertical support members. This embodiment contains an increased number of arched vertical supports 12 and 14 and also vertical support members 42 for additional stability of the structure. The combination greenhouse cold frame apparatus is therefore easily extendable and adaptable for the addition of support members.

Figure 6A:
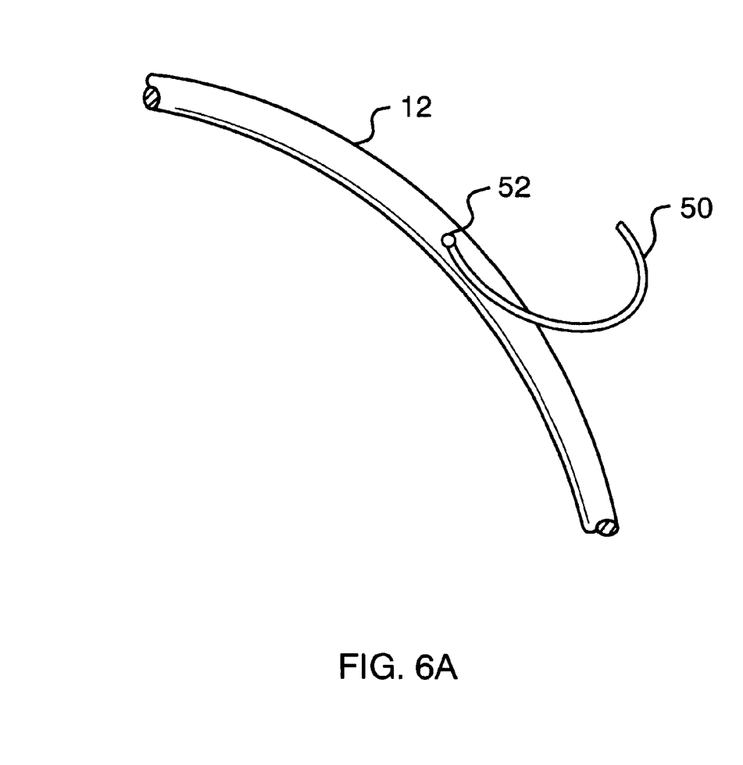
FIG. 6 is a front and profile view of one embodiment of a securing device for releasably attaching a horizontal member connected to an end of a foldable side panel.
Figure 6B:
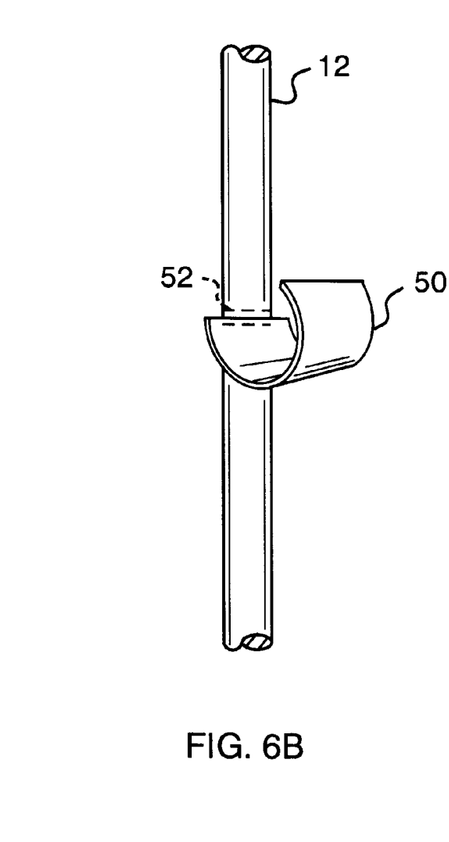
Figure 7A:
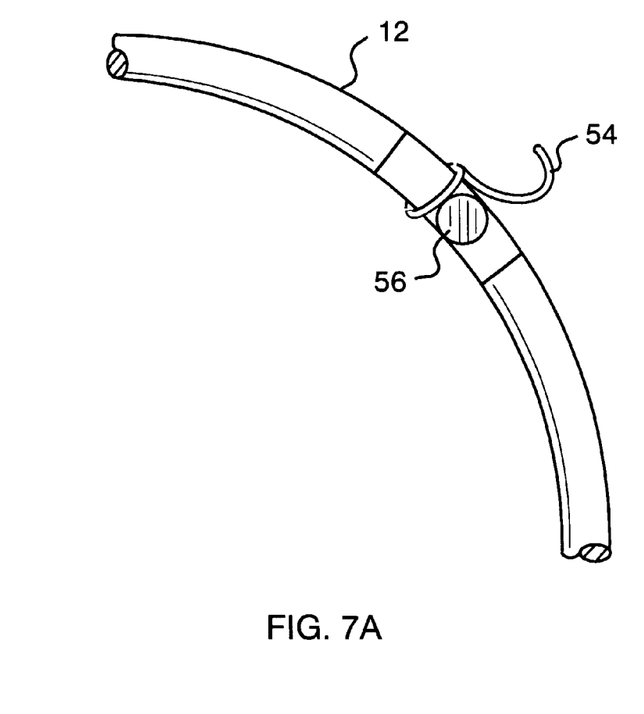
FIG. 7 is a front and profile view of another embodiment of a securing device for releasably attaching a horizontal member connected to an end of a foldable side panel.
Figure 7B:
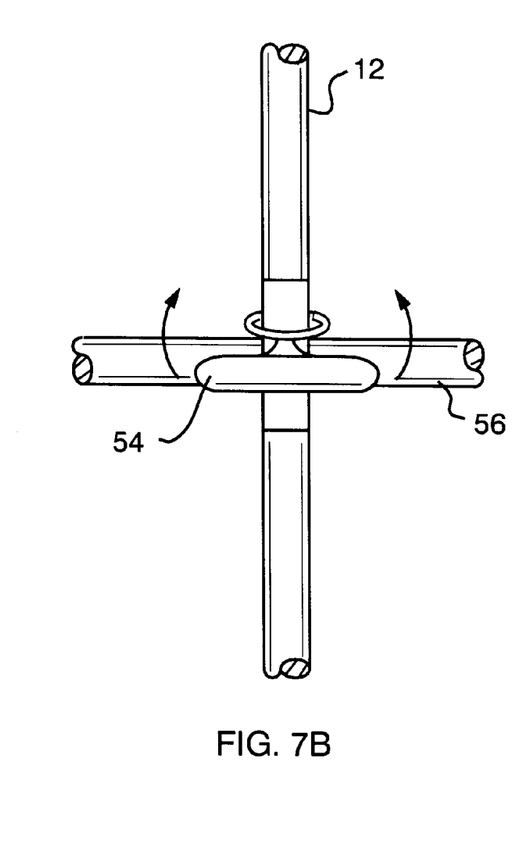
Figure 8A:
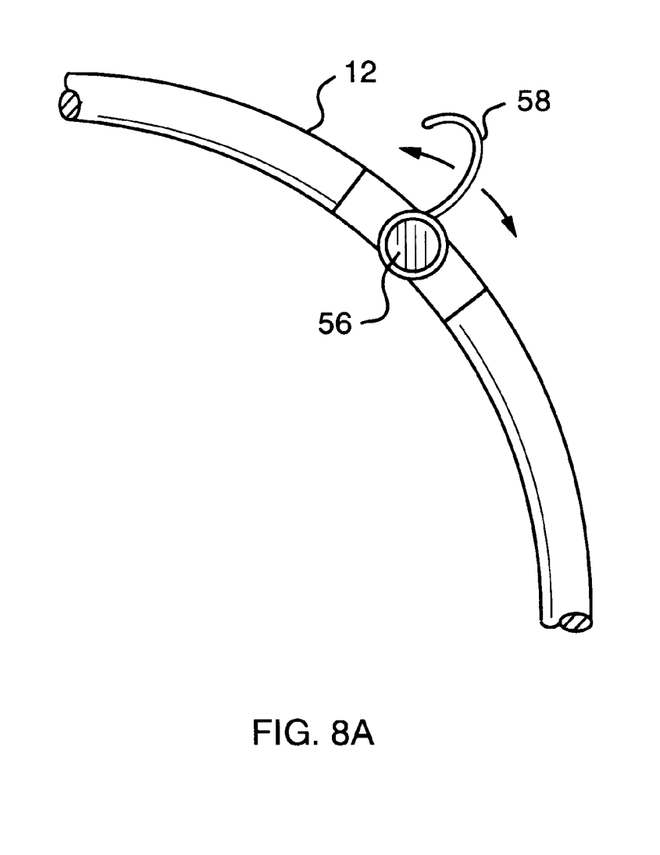
FIG. 8 is a front and profile view of still another embodiment of a securing device for releasably attaching a horizontal member connected to an end of a foldable side panel.
Figure 8B:
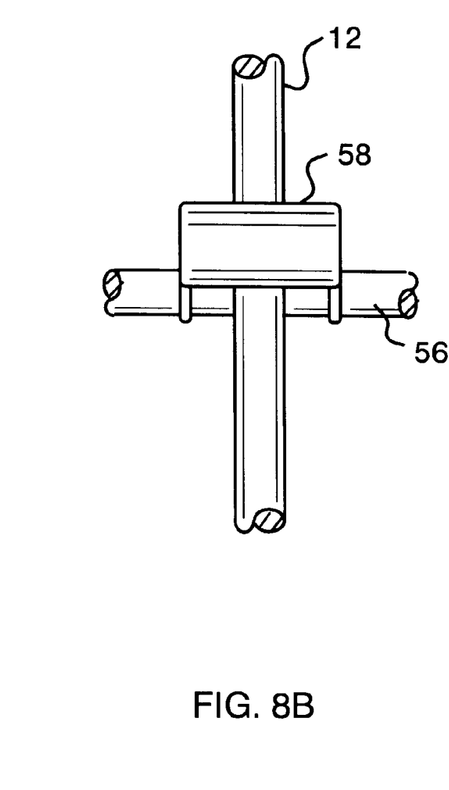

FIG. 6 is a front and profile view of one embodiment of a securing device for releasably attaching a horizontal member of a foldable side panel. The securing device is inserted into a horizontal groove 52 in arched vertical leg 12. A horizontal member attached to an end of a foldable side panel is releasably attached to a curved portion 50 of the securing device to provide open positions for ventilation of the combination greenhouse and cold frame apparatus. FIGS. 7 and 8 show different embodiments of securing devices with curved portions 54 and 58 clasped to horizontal support member 56 that is attached to arched vertical leg 12.

Figure 9A:
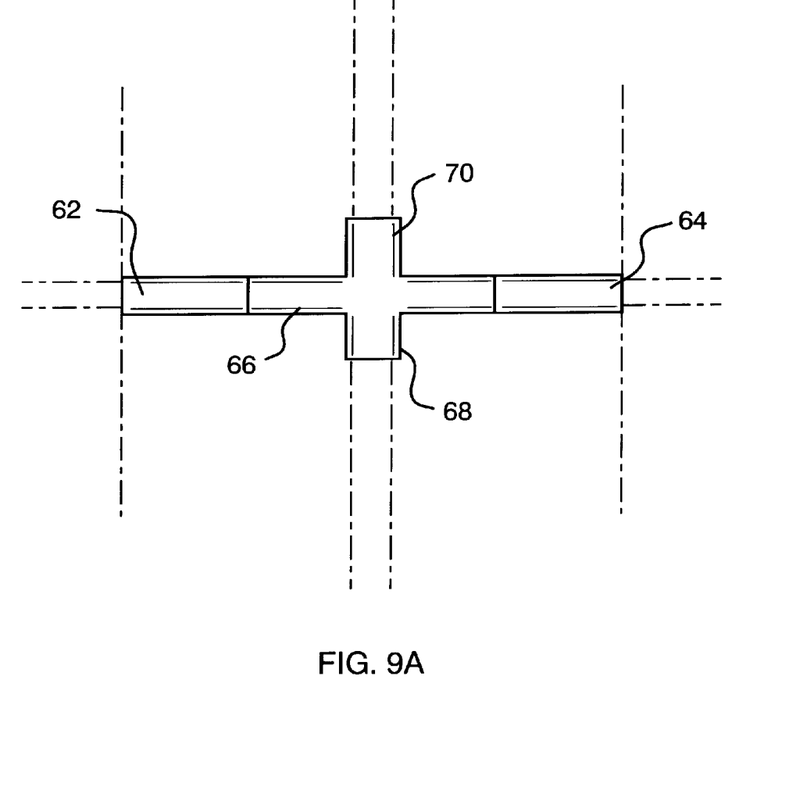
FIG. 9 is an isometric and top view of one embodiment of a top frame connector.
Figure 9B:
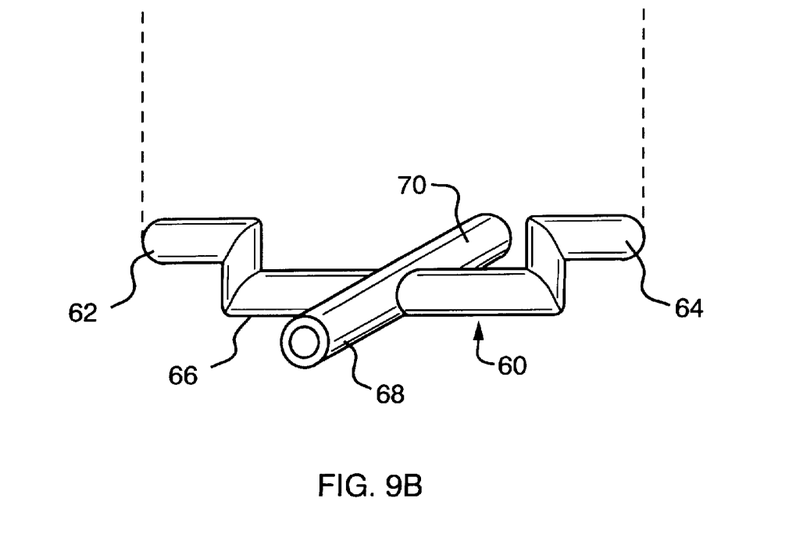

FIG. 9 is an isometric and top view of one embodiment of a top frame connector 60 used for connecting opposing arched vertical legs at extensions 62 and 64 and horizontal support members at extensions 68 and 70. Top frame connector 60 also has a U-shaped portion 66 for placing horizontal members of foldable side panels together or separately to define a plurality of open positions and a closed position.

Connectors well known in the art are used to connect different frame support members. Some examples of these are push in, screw and cap connectors.

Although the present invention has been described in considerable detail with reference to certain preferred versions thereof, other versions would be readily apparent to those of ordinary skill in the art. Therefore, the spirit and scope of the appended claims should not be limited to the description of the preferred versions contained herein.

What is claimed is:

1. A combination greenhouse and cold frame apparatus, said apparatus comprising:
   a plurality of left arched vertical legs;
   a matching plurality of right arched vertical legs with each left arched vertical leg opposite to an opposing right arched vertical leg;
   a plurality of top frame connectors with each top frame connector having a left end, a right end and a U-shaped portion; wherein said left ends of said plurality of top frame connectors are connected to said plurality of left arched vertical legs and said right ends of said plurality of top frame connectors are connected to said matching plurality of right arched vertical legs;
   a top left horizontal member and a top right horizontal member substantially perpendicular to said left arched vertical legs and said right arched vertical legs;
   a bottom left horizontal member and a bottom right horizontal member substantially perpendicular to said left arched vertical legs and said right arched vertical legs;
   a left foldable side panel connecting said top left horizontal member and said bottom left horizontal member;
   a right foldable side panel connecting said top right horizontal member and said right bottom horizontal member,
   such that placement of said top left horizontal member and said top right horizontal member in said plurality of U-shaped portions of said top frame connectors and said left bottom horizontal member and said right bottom horizontal member adjacent to the ground defines a closed position for said apparatus, and such that said top left horizontal member and said top right horizontal member can independently be moved in a downward direction and placed adjacent to the ground to define either a full top open position, a left top open position or a right top open position, and such that said left bottom horizontal member and said right bottom horizontal member can independently be moved in an upward direction and placed in said U-shaped connector to define a full bottom open position, a left bottom open position or a right bottom open position;

wherein the environment within said combination greenhouse and cold frame apparatus is controlled.

2. The combination greenhouse and cold frame apparatus as claimed in claim 1, further comprising a plurality of securing devices attached to a plurality of positions on an outer surface of said plurality of left arched vertical legs and said matching plurality of right arched vertical legs, such that said top left horizontal member, said bottom left horizontal member, said top right horizontal member and said bottom right horizontal member can independently be releasably attached to said plurality of securing devices to define a plurality of partial open positions.

3. A combination greenhouse and cold frame apparatus, said apparatus comprising:

a first section, said first section comprising:

a plurality of left arched vertical legs;

a matching plurality of right arched vertical legs with each left arched vertical leg opposite to an opposing right arched vertical leg;

a plurality of top frame connectors with each top frame connector having a left end, a right end and a U-shaped portion; wherein said left ends of said plurality of top frame connectors are connected to said plurality of left arched vertical legs and said right ends of said plurality of top frame connectors are connected to said matching plurality of right arched vertical legs;

a top left horizontal member and a top right horizontal member substantially perpendicular to said left arched vertical legs and said right arched vertical legs;

a bottom left horizontal member and a bottom right horizontal member substantially perpendicular to said left arched vertical legs and said right arched vertical legs;

a left foldable side panel connecting said top left horizontal member and said bottom left horizontal member;

a right foldable side panel connecting said top right horizontal member and said right bottom horizontal member, such that placement of said top left horizontal member and said top right horizontal member in said plurality of U-shaped portions of said top frame connectors and said left bottom horizontal member and said right bottom horizontal member adjacent to the ground defines a closed position for said apparatus, and such that said top left horizontal member and said top right horizontal member can independently be moved in a downward direction and placed adjacent to the ground to define either a full top open position, a left top open position or a right top open position, and such that said left bottom horizontal member and said right bottom horizontal member can independently be moved in an upward direction and placed in said U-shaped portion of said top frame connector to define a full bottom open position, a left bottom open position or a right bottom open position;

a second section substantially identical to said first section, such that said second section is releasably attached to said first section in a linear direction;

wherein the environment within said combination greenhouse and cold frame apparatus is controlled.

4. The combination greenhouse and cold frame apparatus as claimed in claim 3, wherein said apparatus comprises a plurality of releasably attached sections each section being substantially identical to said first section, and wherein said plurality of releasably attached sections are connected in a linear direction.

5. The combination greenhouse and cold frame apparatus as claimed in claim 1, further comprising a plurality of top horizontal support members connectable between said plurality of top frame connectors and substantially perpendicular to said left arched vertical legs and said right arched vertical legs.

6. The combination greenhouse and cold frame apparatus as claimed in claim 5, further comprising a plurality of side horizontal support members substantially perpendicular to said left arched vertical legs and said right arched vertical legs, such that said plurality of side horizontal support member are connectable between adjacent members of said left arched vertical legs and adjacent members of said right arched vertical legs to prevent sagging of said left foldable side panel and said right foldable side panel.

7. The combination greenhouse and cold frame apparatus as claimed in claim 6, further comprising end vertical arched supports connectable to said top frame connectors, such that said end vertical arched supports are substantially perpendicular to said left arched vertical legs and said right arched vertical legs and opposing said plurality of top horizontal support members.

8. The combination greenhouse and cold frame apparatus as claimed in claim 4, wherein said apparatus further comprising end vertical arched supports connectable to said top frame connectors, such that said end vertical arched supports are substantially perpendicular to said left arched vertical legs and said right arched vertical legs and opposing said plurality of top horizontal support members.

9. The combination greenhouse and cold frame apparatus as claimed in claim 8, wherein at least one section of said plurality of releasably attached sections further comprising a plurality of top horizontal support members connectable between said plurality of top frame connectors and substantially perpendicular to said left arched vertical legs and said right arched vertical legs.

10. The combination greenhouse and cold frame apparatus as claimed in claim 9, wherein at least one section of said plurality of releasably attached sections further comprising a plurality of side horizontal support members substantially perpendicular to said left arched vertical legs and said right arched vertical legs, such that said plurality of side horizontal support member are connectable between adjacent members of said left arched vertical legs and adjacent members of said right arched vertical legs to prevent sagging of said left foldable side panel and said right foldable side panel.

* * * * *